(12) United States Patent
Tucker et al.

(10) Patent No.: US 6,168,362 B1
(45) Date of Patent: *Jan. 2, 2001

(54) IMPACT-DRIVEN PLASTIC FASTENERS

(75) Inventors: Pamela S. Tucker; Nancy Showers, both of Austin, TX (US)

(73) Assignee: Utility Composites, Inc., Round Rock, TX (US)

( * ) Notice: Under 35 U.S.C. 154(b), the term of this patent shall be extended for 0 days.

This patent is subject to a terminal disclaimer.

(21) Appl. No.: 09/104,866

(22) Filed: Jun. 25, 1998

Related U.S. Application Data

(63) Continuation of application No. 08/698,580, filed on Aug. 15, 1996, now Pat. No. 5,795,121, which is a continuation-in-part of application No. 08/198,845, filed on Feb. 18, 1994, now Pat. No. 5,547,325, and a continuation-in-part of application No. PCT/US95/07032, filed on Feb. 17, 1995.

(51) Int. Cl.[7] ............................. F16B 15/00; F16B 15/08; B65D 85/24
(52) U.S. Cl. ........................ 411/442; 411/908; 411/920; 206/345
(58) Field of Search ..................................... 411/442, 443, 411/444, 446, 457, 908, 920; 206/343, 345

(56) References Cited

U.S. PATENT DOCUMENTS

| | | |
|---|---|---|
| 2,510,693 | 6/1950 | Green . |
| 3,112,667 | 12/1963 | Brentlinger . |
| 3,165,968 | 1/1965 | Anstett . |
| 3,225,917 | 12/1965 | Couch . |
| 3,252,569 | 5/1966 | Matthews . |
| 3,348,669 | 10/1967 | Powers . |
| 3,492,907 | 2/1970 | Hauck . |
| 3,813,985 | 6/1974 | Perkins . |
| 3,915,299 | 10/1975 | Miyaoku . |
| 4,206,264 | 6/1980 | Kurr . |
| 4,456,123 | 6/1984 | Russell . |
| 4,644,733 | 2/1987 | Masago . |
| 4,826,381 | 5/1989 | Kiriyama . |
| 4,863,330 | * 9/1989 | Olez et al. ................... 411/908 X |
| 4,903,831 | 2/1990 | Francis . |
| 4,909,690 | * 3/1990 | Gapp et al. ................... 411/908 X |
| 4,971,503 | * 11/1990 | Barnell et al. ................ 411/443 |
| 5,098,940 | 3/1992 | Brooks . |
| 5,149,237 | * 9/1992 | Gabriel et al. ................ 411/446 |
| 5,153,250 | 10/1992 | Sinclair . |
| 5,547,325 | * 8/1996 | Tucker et al. ................. 411/442 |
| 5,795,121 | * 8/1998 | Tucker et al. ................. 411/442 |

FOREIGN PATENT DOCUMENTS

WO 95/22697 8/1995 (WO) .

OTHER PUBLICATIONS

"AMODEL® Polythalamide" AMOCO brochure, p. 14, date unknown.
Letter, 3 pages, Jun 1, 1987, and brochure "KOWA T NAIL" from Marukyo U.S.A., Inc., six pages, printed in Japan, date known.
"Resins and Compounds" 10 pages, *Modern Plastics*, Mid–Oct. 1991.
"Properties of Generic Materials", *International Plastics Selector*, A30–A33, A56–A–59, 1989.
Information about TREX, TREX web site, www.trew.com/trexdecks/working2.htm, 9 pages, Apr. 21, 1998.

* cited by examiner

*Primary Examiner*—Neill Wilson
(74) *Attorney, Agent, or Firm*—Conley, Rose & Tayon, PC; Eric B. Meyertons

(57) ABSTRACT

A continuous impact-driven fastener pack made of ultra-high strength plastic composite materials, for example, thermoplastic or thermoset materials for use in standard impact driving fasteners machines. The individual fasteners have sufficient compressive strength and flexural modulus such that the fastener may be used with commodity woods for construction, furniture making, or for building boats. Further, this fastener pack is non-corrodible and provides plastic fasteners having a length/diameter ratios of a working nail or staple, e.g., heretofore unavailable.

40 Claims, 8 Drawing Sheets

IMPACT-DRIVEN PLASTIC FASTENERS

This is a continuation of application Ser. No. 08/698,580 filed Aug. 15, 1996 now U.S. Pat. No. 5,795,121, which is a continuation-in-part of Ser. No. 08/198,845, filed Feb. 18, 1994 (now U.S. Pat. No. 5,547,325) and also of PCT/US95/07032 filed Feb. 17, 1995.

BACKGROUND OF THE INVENTION

1. Field of the Invention

The present invention relates generally to the field of impact-driven plastic fasteners. More particularly, it concerns an improved plastic fastener pack for use in impact driving fastener machine. The fasteners are made of ultra-high strength plastic composites, for example, thermoplastic or thermoset materials. A purpose of the present application is to include additional information obtained since the date of the original filing regarding other fasteners and other specific materials. A further purpose includes the description impact driven fasteners, other than nails, that perform according to the same criteria used for nails of the present invention. For the latter, the inventors' purposes could be served by substituting "impact driven fastener" in every instance that "nail" is used in the original patent specification except in specific examples involving nails.

2. Description of the Relevant Art

The use of machine-driven fasteners is widespread in industry, particularly in construction. Applications include furniture making, cabinet making, boat manufacture, roofing, dry wall installation, deck building, fence building and interior finish out, to name but a few. A major concern affecting the lifetime, quality and appearance of such applications is corrosion of the fastener. Galvanization of impact-driven metal fasteners such as, e.g., nails is the predominant method for reducing corrosion. Other methods include using aluminum or stainless steel or plastic-coated fasteners. All of these methods add considerable cost to the finished fastener, and do not completely prevent fastener corrosion.

Attempts have been made to produce nail fasteners from materials that do not significantly corrode, namely plastics. U.S. Pat. No. 2,510,693 to Green, Jun. 6, 1950 relates to fasteners made from a thermoplastic material having reinforcing fibers therein. U.S. Pat. No. 3,165,968 to Anstett, Jan. 19, 1965 describes a synthetic plastic nailing strip of, for example, a polyamide resin. U.S. Pat. No. 3,112,667 to Brentlinger, Dec. 3, 1963 relates to nails for use in dry wall construction, the nails having a recessed head and means for preventing flattening of the head when the nail is driven into a dry wall panel. U.S. Pat. No. 3,225,917 to Couch, Dec. 28, 1965 relates to a package of drive type fasteners for use in automatic nailing machines. U.S. Pat. No. 3,252,569 to Matthews, May 24, 1966 describes a plastic coated laminated nail having a reinforcing metallic wire core and a thermoplastic body. U.S. Pat. No. 3,348,669 to Powers, Oct. 24, 1997 describes formation of tools adapted to sever and drive individual fasteners form a stick supply of fasteners.

U.S. Pat. No. 3,492,907 to Hauck, Feb. 3, 1997 relates to a molded plastic tack strip adapted for use in a tack gun, the strip having a plurality of closely spaced tack shanks interconnected by severable webs. U.S. Pat. No. 3,813,985 to Perkins, Jun. 4, 1974 relates to coated fasteners, adhesive-coating compositions for fasteners, single-bevel, divergent point staples, and groups of staples united by an adhesive coating. U.S. Pat. No. 3,915,299 to Miyaoku, Oct. 28, 1975 describes a nail strip having side-to-side perforations in each nail permitting their alignment and belt threaded through them for connection. The nail may be made of steel-reinforced plastics, such as methyl methacrylate, with waterproof, anti-moisture and anti-corrosion properties.

U.S. Pat. No. 4,456,123 to Russell, Jun. 26, 1984 relates to a method for attaching price tags to garments and for other joining applications using plastic fasteners dispensed through hollow, slotted needles. U.S. Pat. No. 4,664,733 to Masago, May 12, 1987 describes cohered fasteners, in particular, cohered nails, secured together in contiguous relation wherein separation of a fastener to be driven is facilitated. A group of wires is coated with an adhesive of thermoplastic resin and a second coating of nitrocellulose resin to form a strip for shaping into desired fasteners.

U.S. Pat. No. 4,826,381 to Kiriyama, May 2, 1989, incorporated by reference herein, relates to a continuous nail for automatic nailing machines. Each nail is injection molded with a thermoplastic resin e.g., polyamide resin, mixed with reinforcing materials, such as fine glass fiber, carbon fiber, etc. to improve the strength of the nail. The surface of the nail will be melted by frictional heat when it is driven for nailing. Kowa T Nail, a manufacture's brochure mentioned in patent '381, relates to a plastic nail, a plastic staple and pneumatic nailer. The shape of the nail and low L/d necessitated the development of a special pneumatic tacker.

U.S. Pat. No. 4,971,503 to Barnell et al., Nov. 20 1990 describes nail packs and clips used in automatic nailing guns. The nail package may contain plastic nails interconnected by integrally molded upper webs and lower webs. The plastic is a thermoplastic having high impact resistance and high tensile strength, such as Ultem, Nylon, A.B.S., polyester, polyphenoleneoxide and polycarbonate. U.S. Pat. No. 5,098,940 to Brooks, Mar. 24, 1992 relates to crystalline polyphthalamide component and a particular thermotropic liquid crystalline polymer component in an amount sufficient to nucleate a melt of the polyphthalamide. The compositions are reported to be useful as injection molding compounds for production of electronic connectors, switch components, pump housings, valve components and under-the-hood automobile parts.

U.S. Pat. No. 5,153,250 to Sinclair, Oct. 6, 1992 describes compositions comprising (1) a polyphthalamide component compromising at least two recurring units selected from the group consisting of terephathalamide units, isophthalamide units and adipamide units and which, when filled with glass fibers, has a heat deflection temperature at 264 psi, according to ASTM D-648, of at least about 240° C.,; (2) about 10 to about 200 parts by weight reinforcing fibers per hundred parts by weight of the polyphthalamide component and (3) at least about 0.01 to about 5 parts by weight particulate talc per hundred parts by weight of the polyphthalamide component. The cited uses are the same as for U.S. Pat. No. 5,098,940.

U.S. Pat. No. 4,206,264 to Kurr relates to a group of polyester resins for coating fasteners. U.S. Pat. No. 5,149,237 to Gabriel et al. Also relates to a coating for metal fasteners. The coating is a combination of two resins, a copolymer of preferably styrene and maleic anhydride and a thermoplastic resin, preferably vinyl acetate. U.S. Pat. No. 4,903,831 to Francis relates to an automatic nailer system which employs plastic ferrules which hold nails to form a strip.

The present inventors have discovered that the design of a fastener such as a nail or staple, e.g., for impact penetration is analogous to that of structural columns (*Mechanics of Materials*, 3rd ed., by Higdon et al., John Wiley & Sons, New York, 1976; and *Design of Wood Structures*, 3rd ed., by D. E. Breyer, McGraw-Hill, Inc., New York, 1993), with proper adjustments for the rate of load being applied, and assuming uniform stress in the fastener during penetration. Adjustment of the rate of loading is accomplished by multiplication of a constant for impact loads. It serves to increase the allowable column stress compared to a load applied over a long period of time. The effect is the same for all plastic material types, therefore, is not applied in the analysis presented herein.

In ideal column design, two types of columns are considered: short and long. The former implies that the column will not buckle and its strength is related to the compression strength of the material. The latter presumes column instability, called buckling, as the only failure mechanism. In most situations, design of real columns, or nails, must consider the possibility of buckling (midsection of column) and crushing (ends of column). Actual column/nail behavior is defined by the intersection of the buckling and crushing modes of failure.

Whether the column is short or long is determined by the slenderness ratio which is the primary measure of buckling. The slenderness ratio is defined as $$\text{slenderness ratio} = \frac{\text{effective unbraced length of column}}{\text{least radius of gyration}} = \frac{L}{d}$$

Pure crushing can be considered the mechanism of failure for slenderness ratios less than about 2 or 3, and is measured by the compressive strength of the material. For slenderness ratios above about 130, buckling can be considered the single mode of failure. The maximum stress for pure buckling is defined by the Euler critical buckling stress for long slender members:

$$F_b = \frac{\pi^2 E}{(L/d)^2}$$

$F_b$ = Euler critical buckling stress
$E$ = flexural modulus
$L$ = length
$d$ = diameter (effective diameter)

To determine the actual maximum load the member can withstand without failure of either type, slenderness ratios between 3 and 130 should be analyzed using an empirical column formula to account for both buckling and crushing of the column member. Numerous empirical formulas exist for describing the maximum load for slenderness ratios between about 3 and 130. FIG. 3 depicts a maximum column load as a function of slenderness ratio ($s_{max}$ is the compressive strength and E is the flexural modulus). The regions of pure crushing, pure buckling and combinations of crushing and buckling are shown. For simplicity, the materials of the examples presented herein are analyzed as ideal columns. In this case, the lines defining pure crushing and pure buckling define the maximum stress the member can withstand. Any of the empirical formulas could be chosen and applied to materials for detailed, individual analysis, but is unnecessary for comparisons between materials. It would have the same effect as multiplying all numbers by a constant; the relative values are still maintained.

Current plastic nails or staples insufficiently penetrate commodity woods such as white, yellow and treated pine, chip board or oak, nor can they be formed into a standard shape to fit existing nailers. In addition, current plastic nails or staples are limited to a length/diameter ratio of less than about 16 with the overall length not generally exceeding one inch.

The present improvements comprise a further description of plastic impact driven fastener packs mountable in impact driving fastener machines for fasteners. The pack comprises plastic composite fasteners having a high compressive strength and high flexural modulus heretofore unavailable. The plastic composite materials of the fasteners of the present invention have a compressive strength greater than about 20,000 psi and a flexural modulus greater than about $1.2 \times 10^6$ psi.

A fastener pack in accordance with the invention comprises a plurality of fasteners of the invention joined in a strip, belt, clip or the like for sequential entry into an impact driving fastener machine and subsequent penetration of substrates such as wood, plaster board and the like. It is especially contemplated that the fasteners of the invention will be arranged side-by-side and fed one-by-one into an impact driving fastener machine.

The Euler stress to fail described for nails applies likewise to all impact driven fasteners regardless of shape, such as staples, spikes, brads, pins, corrugated fasteners, rivets, and the like. The difference between a staple and a nail is that two shafts are being driven at the same time for the former while only one is being driven at a time for the latter. Despite the connecting crown of the staple, ability of the legs to penetrate a substrate successfully can be analyzed independently as two single columns by the Euler stress to fail (a function of compressive strength and flexural modulus) for a given slenderness ratio as described for nails. The difference between a spike and a nail is size, but successful penetration is analyzed identically. The difference between corrugated fasteners and nails is the cross-sectional shape of the fastener. Methods of accounting for different cross-sectional shapes to determine the Euler stress to fail are known and based on the least radius of gyration in calculation of the slenderness ratio. For all impact driven fasteners, independent of shape, the primary two material properties which are important in achieving a working fastener are compressive strength and flexural modulus. A stringent requirement of a working impact-driven object is penetration into wood as described.

A method of making the described plastic impact driven fastener is a further aspect of the present invention. The method comprises the steps of obtaining a plastic composite having the requisite flexural modulus and compressive strength, molding the plastic composite directly into a collated pack of fasteners or molding the plastic composite into individual fasteners and then collating the fasteners into a pack.

A further embodiment of the present invention is a method of attaching a impact driven fastener penetrable material to a substrate. The method comprises the steps of obtaining the penetrable material, loading the plastic impact driven fastener pack of the invention in an impact driving fastener machine such as a nailer or stapler, and driving the fasteners through the material to be attached and into the substrate.

Characteristics, advantages and applications of the general impact driven fasteners of this invention are similar, if not the same as, the characteristics, advantages and applications of nails, perhaps the most common impact driven fastener.

SUMMARY OF THE INVENTION

The present invention provides a plastic impact-driven fastener and an impact driven fastener pack mountable in an impact driving fastener machine. The pack comprises plastic composite impact-driven fasteners having drivability characteristics heretofore unavailable. The plastic composite materials of the fasteners of the present invention have a compressive strength greater than about 20,000 psi and a flexural modulus greater than about $1.2 \times 10^6$ psi. They are completely drivable into white or yellow pine and at least partially drivable through oak. The fasteners may be formed into packs by any of the numerous methods used to collate staples or nails, e.g., to form packs loadable into impact driving fastener machines. Impact driving fastener machine means automatic and manual impact driving devices for fasteners, including such devices as nailers, bradders, pinners, riveters and staplers with hammers activated automatically, such as those having pneumatic, electric, shell or cartridge-activated hammers, or with hammers activated manually, such as spring-activated or momentum activated hammers.

Compressive strength is the ability of a material to resist a force that tends to crush it. Its value is given by the crushing or compressive load at the failure of a specimen divided by the original area of the specimen (ASTM Test D695). Compressive strength of nails of the present invention, nails made from other materials and commercially available Kotowa nails is represented in FIG. 4 by the horizontal portion of the graph. The maximum stress to fail for L/d ratios less than about 20–24 is described as compressive strength and is independent of the L/d ratio. The mode of failure for nails of these L/d ratios is primarily that of crushing.

Flexural modulus is the ratio, within the elastic limits, of the applied stress on the test specimen to the corresponding strain in the outermost fibers of the specimen. The applied stress is during a bending or flexing cycle, where the specimen is supported at two points with the stress being applied midway between them (ASTM Test D790). Flexural modulus is independent of L/d ratio, and is used to describe the strength during penetration of a nail at L/d ratios where bending or buckling is the primary mode of failure. The Euler bending or buckling stress is a function of L/d ratio and flexural modulus and is calculated as previously described using these parameters. The Euler bending stress is represented by the curved lines of FIG. 4 and is the maximum stress to fail at higher L/d ratios where bending or buckling is the primary mode of failure.

An impact-driven fastener pack in accordance with the invention comprises a plurality of fasteners of the invention joined in a strip, belt, clip or the like for sequential entry into an impact driving fastener machine and subsequent penetration of materials such as wood, plaster board, plastics and the like. It is especially contemplated that the fastener packs of the invention will be arranged side-by-side and fed one-by-one into an impact driving fastener machine.

The slenderness ratio, L/d, is the length of the cylindrical fastener such as a nail or staple divided by the diameter (approximately equal to the least radius of gyration for nearly circular cross sections). As used herein, diameter is effective diameter and may describe the diameter of a fastener other than a round fastener, for example, in some cases this could be the average width of a square, oval, triangular or rectangular fastener.

A preferred plastic composite is a composite thermoplastic or thermoset material having the desired flexural modulus and compression strength. A thermoplastic material is a material that undergoes no permanent change on heating, it flows when heated and may be reformed into a new shape. Exemplary ultra-high strength composite thermoplastic materials of the present invention are fiber-filled polyphthalamide (PPA), polyamide NM-6, aromatic polyamide, polyphenylene sulfide, polyetherimide, and polyamide-imide. The polyphthalamide component of fiber-filled polyphthalamide comprises tereplithalamide, isoplithalamide and adipamide units. The fiber component of PPA comprises from about 10% to 66% by weight of the PPA component. A most preferred composite is a glass reinforced polyphthalamide having about 33 to about 45% glass.

A thermoset material is a material capable of a high degree of crosslinking. Generally it is molded in a partially polymerized state so it flows when heated. During the molding process, further polymerization occurs and the plastic becomes highly crosslinked and no longer flows, it cannot be reformed into a new shape. Exemplary ultra-high strength composite thermoset materials of the present invention are reinforced phenolic compounds, urea or melamine formaldehyde, furan resin, polyester, epoxy, polyurethane, polyisocyanurate, polyimide or polybenzimidazole.

A preferred embodiment is wherein each fastener has a compression strength greater than about 25,000 psi and a flexural modulus greater than about $1.6 \times 10^6$ psi and a more preferred embodiment is wherein each fastener has a compression strength greater than about 30,000 psi and a flexural modulus greater than about $1.9 \times 10^6$ psi.

A particular embodiment of the present invention includes a plastic fastener pack mountable in an impact driving fastener machine, the pack comprising ultra-high strength fiber filled polyphthalamide fasteners, each nail having a compression strength greater than about 20,000 psi and a flexural modulus greater than about $1.2 \times 10^6$ psi. Further, polyphenylene sulfide fasteners having an L/d ratio from about 24 to about 36 having a compression strength greater than about 20,000 psi and a flexural modulus greater than about $1.2 \times 10^6$ psi are an aspect of the present invention.

The fasteners of the present invention are driveable through a commodity wood substantially without deformation or breakage by the impact driving fastener machine. The commodity wood may be pine, chip board, oak, maple, cedar, redwood or cherry. When the fastener is a nail, a preferred nail size has a diameter of about ¹⁄₁₆ inch and a length greater than 1 inch.

Another embodiment of the present invention is the fastener pack described herein and made by a process comprising the steps of obtaining an ultra-high strength plastic composite, and molding the plastic composite into a fastener pack.

A method of making the above described plastic fasteners is a further aspect of the present invention. The method comprises the steps of obtaining an ultra-high strength plastic composite, and molding the plastic composite into a fastener pack. The plastic composite has a compression strength greater than about 20,000 psi and a flexural modulus greater than about $1.2 \times 10^6$ psi.

The present invention further provides for a plastic composite fastener having a compression strength greater than about 20,000 psi and a flexural modulus greater than about $1.2 \times 10^6$ psi. The plastic composite may be an ultra-high strength composite thermoplastic, for example, a fiber-filled polyphthalamide or may be a thermoset composite material.

A further embodiment of the present invention is a method of attaching a fastener penetrable construction material. The method comprises the steps of obtaining a fastener penetrable construction material, mounting a fastener pack in an impact driving fastener machine and driving the fasteners through the material to be attached. The fastener pack comprises ultra high strength plastic composite nails wherein each nail has a compression strength greater than about 20,000 psi and a flexural modulus greater than about $1.2 \times 10^6$ psi. The fastener penetrable construction material may, for example, be a commodity wood or plaster board.

Plastic fasteners of the present invention are preferably used for non-structural uses such as furniture making, cabinet making, boat manufacture, roofing, drywall installation, deck building, fence building, interior finish out, lumber tagging, upholstery and tree tagging. They are sufficiently strong to penetrate commodity woods such as white, yellow and treated pine, chip board, oak, maple, cedar, redwood or cherry. It is possible to saw, sand, plane and drill through these fasteners without damaging the tool being used.

Further advantages of the fasteners of the present invention include: i) use in combustible/explosive environments where spark resistance is necessary, ii) in applications where the item being fastened would show evidence of tampering, since these fasteners cannot be readily pulled out, iii) use under water since the fasteners are non-corrodible, iv) use where the location of the fastener cannot be found, v) use where rust is particularly unwanted, such as in privacy fences or decks, and vi) colorability to match or contrast the fastened surface. Tamper evident means the fastener would have to be broken to open or remove. It cannot readily be pulled out and replaced like a metal fastener, so tampering cannot be concealed.

The surprising and unexpected results of the fasteners of the present invention are clearly shown in FIG. 4 where the PPA (Amodel®) nails have superior maximum stress to fail levels. Plastic nails having the remarkable strength of the nails of the present invention were previously unavailable at L/d ratios greater than about 18. The present invention provides for nails and other fasteners having remarkable driveability or penetration performance at L/d ratios up to about 38.

BRIEF DESCRIPTION OF THE DRAWINGS

FIG. 1B is a cross-sectional view of the embodiment of FIG. 1A.

DETAILED DESCRIPTION OF THE PREFERRED EMBODIMENTS

Figure 4:
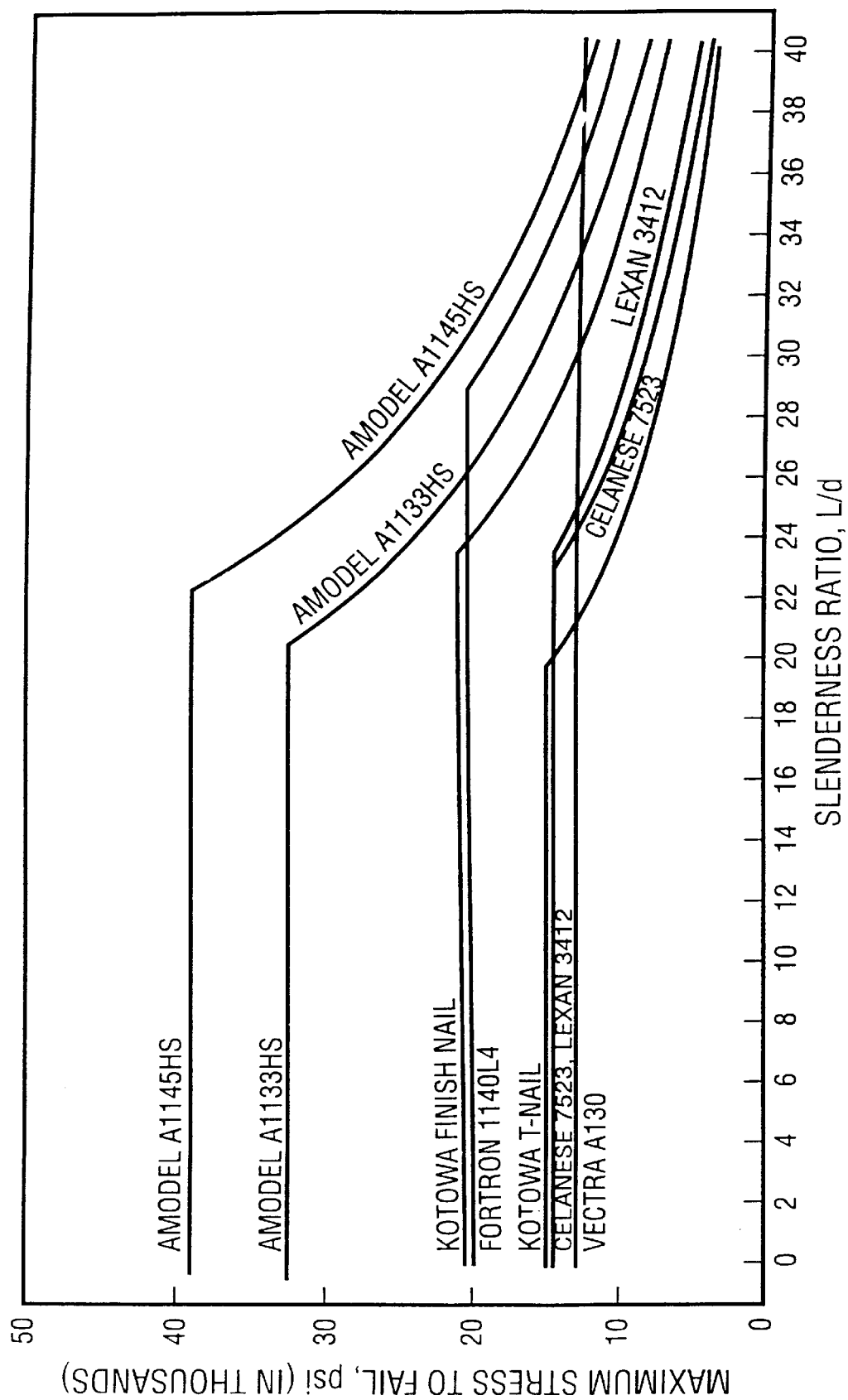
FIG. 4 shows a plot of maximum stress to fail as a function of slenderness ratio for nails of the present invention, commercially available Kotowa nails and nails made from other plastics. The horizontal portion of the graph is an expression of compressive strength, the curved part of the graph is an expression of Euler bending stress which is a function of the flexural modulus of the materials used to make the nails.
Figure 5:
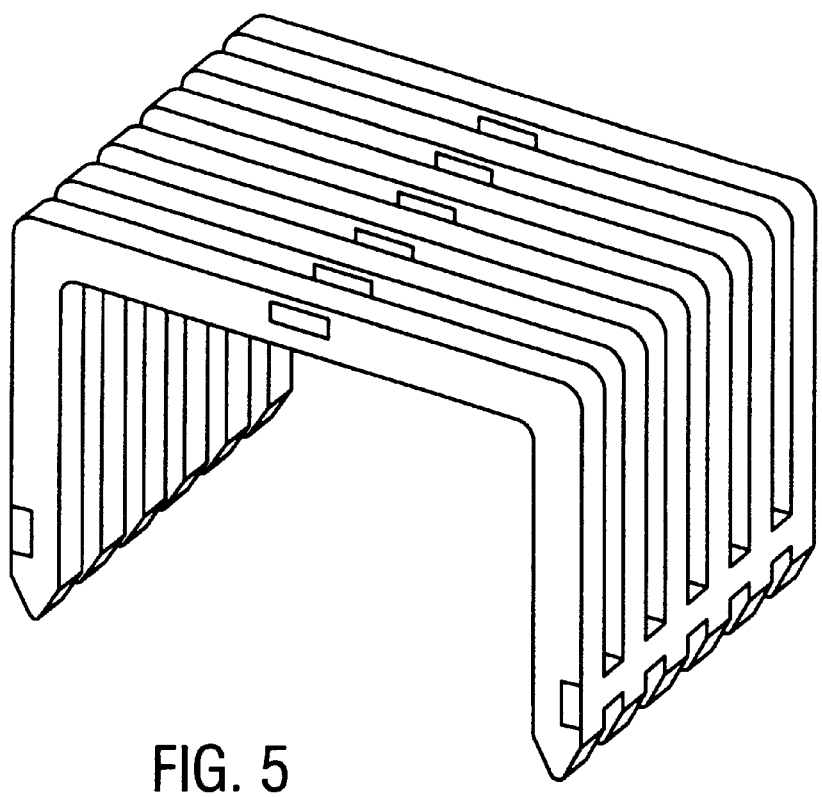
FIG. 5 shows a three-dimensional view of a staple pack having individual staples connected into a strip.
Figure 6:
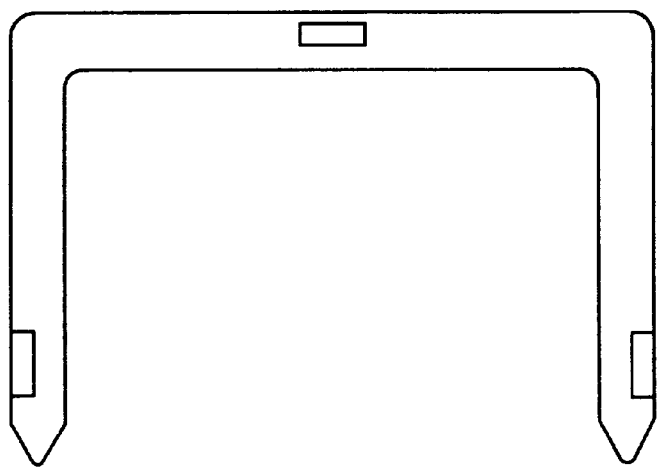
FIG. 6 shows side view of a staple.

The present invention provides an improved plastic fastener pack for use in an impact driving fastener machine. The packs are made of ultra-high strength plastic composites, for example, thermoplastic or thermoset materials. Ultra-high strength as used in the present invention is defined as having a compressive strength greater than about 20,000 psi and a flexural modulus greater than about $1.2 \times 10^6$ psi. Depending on the mode of failure, maximum stress to fail is described as the compressive strength or the Euler bending stress (which is a function of the flexural modulus) of a fastener. In FIG. 4, the horizontal portion of the graph represents compressive strength and the curved lines represent the Euler bending stress.

The design of these collated nail packs (the most common fastener) is based on the size and shape of collated wire nail packs. Likewise, the design of these collated staple packs is based on the size and shape of collated wire staple packs. In nearly all applications where plastic replaces metal, the selection of the plastic and design of the part must be modified to account for differences in physical characteristics of plastic and metal. These differences have been taken into account in the fasteners of the present invention because of the high strength characteristics of the materials used.

Shown in FIGS. 1A, 1B, 2A and 2B is a nail pack 1 of connected nails to be fed into a standard automatic nailer, which dispenses single nails in sequence from the nail pack, thus separating them from the pack by striking their heads to hammer them into the desired position, usually into wood.

Figure 1A:
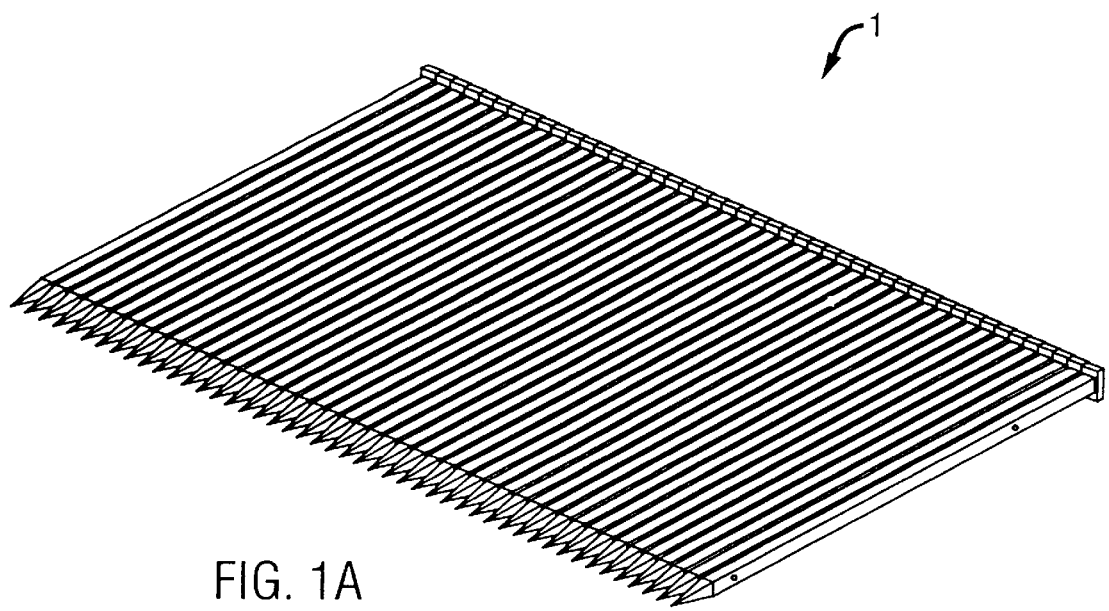
FIGS. 1A and 1B show three dimensional views of a nail pack having individual nails connected into a strip.
Figure 1B:
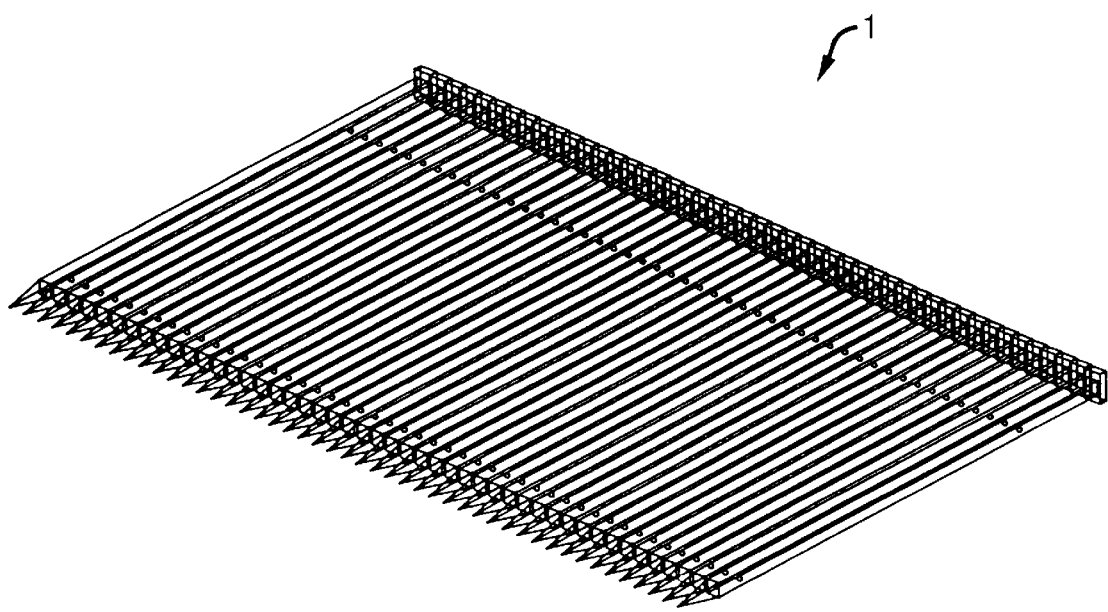
Figure 2A:
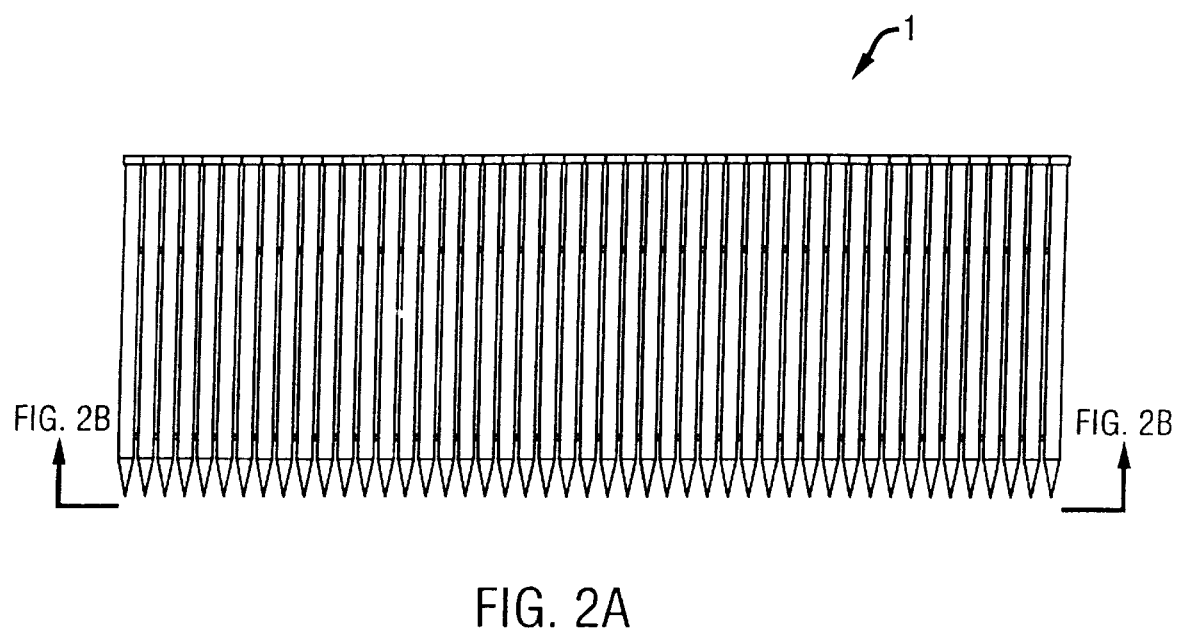
FIGS. 2A, 2B and 2C show a side view of a nail pack (2A), a bottom view of a nail pack along the line 2B . . . 2B of FIG. 2A looking in the direction of the arrows (2B), and a side view of a single nail (2C).
Figure 2B:
Figure 2C:
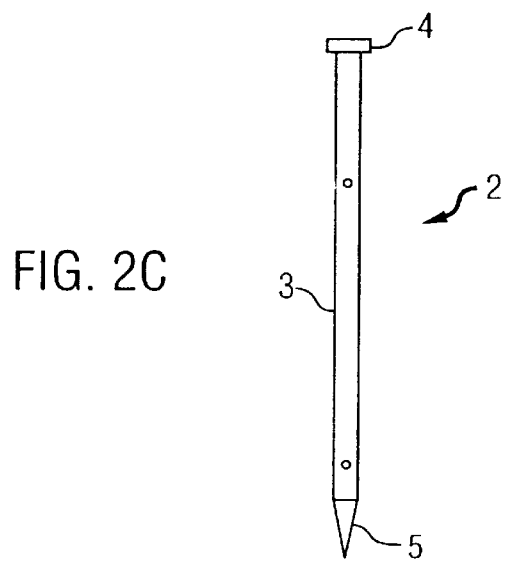
Figure 3:
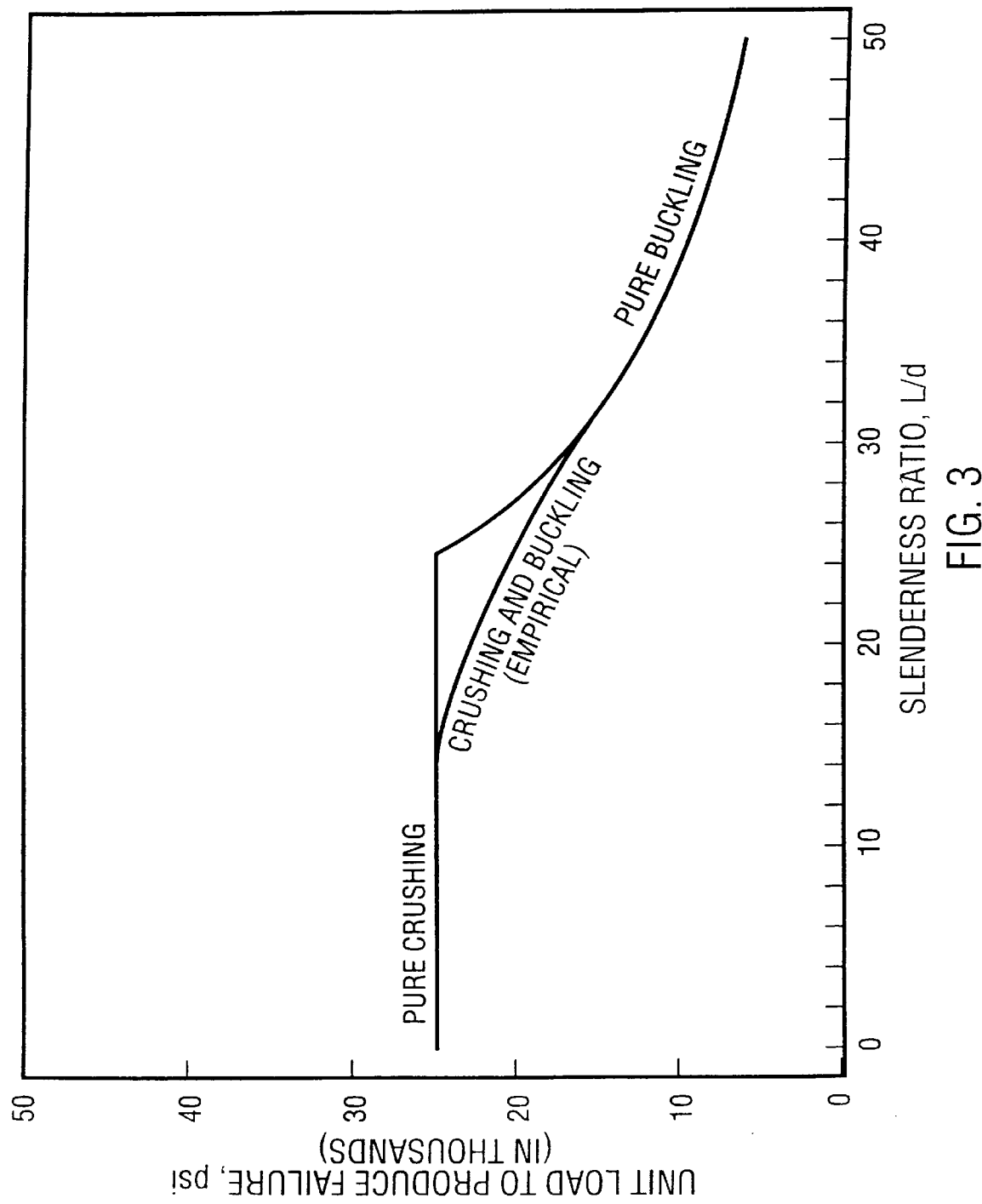
FIG. 3 shows a theoretical plot of unit load to produce failure as a function of slenderness ratio.

Shown in FIG. 2C is a single nail 2. The nail 2 has an elongated shank 3 with a head 4 and a penetrating point 5 on opposite ends thereof The nail shown in 2C has a shaft of square cross section as shown in the bottom view of the nail pack 2B.

The nail packs fit existing industry nailers. Preferred sizes of the nails are those that fit existing tools, such as 14, 15, and 16 gauge finish nails up to about 2.5" in length, for example. Box nails, casing nails, cooler nails, and common nails are included, having L/d values lower than that of finish nails. An advantage of these nails over prior art nails is the ability to be driven into hard woods such as oak, for example.

The nail pack of the present invention is non-corrodible and provides plastic nails having a length/diameter ratio up to about 30, preferably about 10 to about 25. Two important factors in producing a working fasteners (a nail that penetrates wood) is the bending or flexural modulus which should be greater than about $1.2 \times 10^6$ psi and the compressive strength which should be greater is than about 20,000 psi. The individual fasteners meeting these criteria have sufficient impact strength to be fastener into commodity woods for construction, furniture making, or boat building, for example.

A stringent requirement for a working fastener is penetration into wood. Once a Fastener has penetrated wood, the strength of the connection can be determined by tensile and shear tests. The tensile strength of the material determines the pull-out strength. The plastic fasteners of the present invention bond well to wood grain and cannot be removed;

but can only be broken by conventional techniques of removal. The breaking force in tension is the tensile strength of the fastener material. Shear strength of the fastener material will also determine the strength of the connection in shear.

Regarding staples specifically, the staple packs of the present invention fit some existing industry staplers and can be used interchangeably with metal staples in the same stapler tool. An advantage of these staples over prior art staples is the ability to be driven into hard woods such a oak, for example. Additionally, useful applications listed in the original patent application such as ftirniture making, cabinet making, boat manufacture, and roofing are currently done with both staples and nails. At least two useful applications listed in the original patent application including lumber tagging and upholstery, are done exclusively with staples. Prior art staples could not be made to fit industry standard staplers and to drive into hard woods such as oak. Prior art staples could not be made to work in manual staplers.

Unless defined otherwise, all technical terms used herein have the same meaning as commonly understood by one of ordinary skill in the art to which this invention belongs. Although any methods and materials similar or equivalent to those described herein can be used in the practice or testing of the present invention, the preferred methods and materials are now described. Unless mentioned otherwise, the techniques employed herein are standard methodologies well known to one of ordinary skill in the art.

EXAMPLE 1

NAIL PACKS MADE FROM A THERMOPLASTIC, FIBER-FILLED POLYPHTHALAMIDE

This example describes a nail of the present invention made from a fiber-filled polyphthalamide. The fiber-filled polyphthalamide composition is described in U.S. Pat. No. 5,153,250, incorporated herein by reference, and comprises i) a polyphthalamide component comprising at least two recurring units selected from the group consisting of tereplithalamide units, isophthalamide units and adipamide units and which, when filled with glass fibers, has a heat deflection temperature at 264 psi, according to ASTM D-648, of at least about 240° C.; ii) about 10 to about 200 parts by weight reinforcing fibers per hundred parts by weight of the polyphthalamide component and iii) at least about 0.01 to about 5 parts by weight particulate talc per hundred parts by weight of the polyphthalamide component.

Reinforcing fibers contained in the polyphthalamide composition are inorganic or organic fibers having sufficiently high modulus to provide reinforcement to the polyphthalamide component and capable of with standing temperatures employed in melt processing the composition. Suitable reinforcing fibers include glass, graphite, boron, ceramic and aramid fibers, with glass fibers being most preferred.

In PPA resins, 45% loading of chopped glass fiber produces a tensile strength of about 40,000 psi, a flexural modulus of about 2 million psi, and a heat deflection temperature (HDT) of 549° F. Optimal mechanical properties are obtained with melt temperatures ranging between 615–650° F. and for barrel residence times of under 10 minutes. Mold temperatures of at least 275° F. are achieved for complete crystallization and optimum dimensional stability. Parts with heavy wall sections may be molded at lower mold temperatures because of the slow rate of cooling of the mass.

Polyphthalamide (PPA, Amodel® Al 133HS and Al 14511S, Amoco Performance Products, Inc., Ridgefield, Conn. 06877) was dried overnight at 140° F. in a vacuum oven, and fed into a reciprocating screw injection molder at barrel temperatures above the melt of the composition (580–630° F.). The composition was plasticated and injected into a hot cavity (about 275–300° F.) for optimum part properties. Cycle times ranged from about 20 seconds to about 45 seconds. Injection molding machines used were Arburg®, BOY®, and Van Dom®.

Nails made from this polyphthalamide composition have a bending or flexural modulus of $1.36 \times 10^6$ psi and $1.92 \times 10^6$ psi, notched Izod impact strength of 1.5 and 2.1 and compressive strength of 32,000 and 35,000 psi. These values are measured from two different grades of polyphthalamide used for each L/d ratio. Nails produced had an L/d ratio of 22 and 25. Results of maximum stress to fail tests are presented in FIG. 4.

A nail pack made from the fiber-filled polyphthalamide composition of this example was inserted into the following standard nailers: Spotnail HLB I 516P and Spotnail HLB 1516, Spotnail, Inc., Rolling Meadows, Ill. 60008; Paslode 3250-F 16, ITW Paslode, Lincolnshire, Ill. 60069-9950; Hitachi NT65A, Hitachi Power Tools, Norcross, Ga. 30093; Duo-Fast HFN-880, Duo-Fast, Franklin Park, Ill. 6013 1; and Bromon G50T and Bromon G163T, Montreal Stapler, Inc., Montreal, Quebec, Canada. Nails were driven into a variety of connnodity woods.

EXAMPLE 2

NAIL PACKS MADE FROM POLYPHENYLENE SULFIDE

This example describes nails made from-a polyphenylene sulfide (PPS), in particular, Fortrong 1140L4, made by Hoechst Celanese (Chatham, N.J. 07928). PPS may also be obtained from General Electric, Co. (Supec®) and Phillips 66 Co. (Ryton®). Polyphenylene sulfide is a semicrystalline material that offers an excellent balance of high-temperature resistance, chemical resistance, flowability, dimensional stability, and electrical properties. The material can be filled with reinforcement fibers and fillers for injection molding. PPS is prepared from 1,4-dichlorobenzene and sodium sulfide in a polar solvent.

Because of its low melt viscosity, PPS can be loaded as high as 70% with a variety of fillers and reinforcements. The different compound loadings vary the strength, electrical properties, surface properties, dimensional stability, and cost of the compound. With a melt temperature of around 545° F., PPS can withstand short-term end use temperatures to 500° F. PPS typically has heat deflection temperatures (using load of 264 psi) of over 500° F. PPS is inherently flame-resistant because of its chemical structure of 70% aromatic compounds and 30% sulfur. Parts made from a PPS compound can withstand an aggressive chemical environment: no solvents below 400° F. are known to dissolve it.

PPS injection molding is done using a conventional screw injection molding machine with the heater zone temperatures in the range of 600 to 680° F. Precise mold temperature control is essential to obtain high heat dimensional stability for PPS. A measured mold temperature between 275 and 325° F. is sufficient for the material to crystallize.

The polyphenylene sulfide composition was dried overnight at 140° in a vacuum oven and fed into a reciprocating screw injection molder at barrel temperatures above the melt of the composition (580–620° F.). The composition was plasticated and injected into a hot cavity (about 275–300°) for optimum part properties. Cycle times were about 45 seconds. The present inventors have done the molding of this compound. The nails made from polyphenylene sulfide have an L/d ratio of 25, a bending or flexural modulus of $1.7 \times 10^6$ psi (measured), notched Izod impact strength of 1.5 ft-lb/in (manuf. literature) and compressive strength of 20,300 psi (measured). Results of maximum stress to fail tests are presented in FIG. 4.

A nail pack made from the polyphenylene sulfide composition of this example Was inserted into a standard nailer: Spotnail HLB I 516P (Spotnail, Inc., Rolling Meadows, Ill. 60008), and nails were driven into a variety of commodity woods. Polyphenylene sulfide nails have a greater flexural modulus than prior art nails, but AmodelS PPA nails are most preferred because of the high flexural modulus and compression strength of the fiber-filled polyphthalamide.

EXAMPLE 3

NAIL PACKS MADE FROM OTHER ULTRA-HIGH STRENGTH COMPOSITE THERMOPLASTICS

Other ultra-high strength composite thermoplastic materials are expected to work according to the present invention. Polyetherimide such as Ultem® 2400 made by General Electric Co. having a flexural modulus of $1.7–2.5 \times 10^6$ psi and compressive strength of 20,000–31,000 psi is such a material. Polyetherimide is an amorphous high-performance thermoplastic that was introduced in 1982 by GE Plastics under the Ultem trademark. The material is characterized by high strength and rigidity at elevated temperatures, long-term heat resistance, in addition to highly stable dimensional and electrical properties, combined with broad chemical resistance and processability.

Polyetherimide has a chemical structure based on repeating aromatic imide and ether units. High-performance strength characteristics at elevated temperatures are supplied by rigid imide units, while the ether provides the chain flexibility for good melt processability and flow. Polyetherimide is readily processed on most conventional thermoplastic equipment. The resin must be dried thoroughly before melt processing. Melt temperatures of 660 to 800° F. and mold temperatures of 150 to 350° F. are used for injection molding.

Polyamide-imide, such as Torlon® 7130 made by Amoco Performance Products having a flexural modulus of $2.9 \times 10^6$ psi and compressive strength of 37,000 psi is another such material. Thermoplastic polyamide-imides are amorphous, high-temperature engineering thermoplastics, produced primarily by the condensation of trimellitic anhydride and various aromatic diamines. Polyamide-imide is available in unfilled, glass fiber-reinforced, and graphite fiber-reinforced grades. The unfilled grade has the highest impact resistance, while the graphite fiber-reinforced grade has the highest modulus or stiffness.

EXAMPLE 4

PENETRATION AND STRESS TO FAIL TESTS

The analysis presented in this example demonstrates that prior art nails are inferior to nails of the present invention primarily due to the lower strength of the materials used in prior art nails which limits both the hardness of materials (such as wood) that prior art nails can penetrate, and the slenderness ratio that can be achieved with prior art nails.

Polymers were obtained as follows: Vectra® A130 (liquid crystalline polyester) (LCP) was from Hoechst Celanese, Chatham, N.J. 07928. Another manufacturer of LCP is Amoco Performance Products, Inc. (Xydar). Lexan® 3412 (polycarbonate) (PC) was from General Electric Co., Pittsfield, Mass. 01201. Other manufacturers of PC are Dow (Calibre®), Mitsubishi Chemical (Novarex®), and Mobay, (Makrolon®). RX 1-4090 (acrylonitrile butadiene styrene) (ABS) was from The Resin Exchange, Cape Girardeau, Mo. 63701. Other manufacturers of ABS are Dow (Magnum®), General Electric Co. (Cycolac(®), and Monsanto (Lustran®). Zytel® ST-801 (nylon) was from E.I. Du Pont, Wilmington, Del. 19898. Celanese® 6423, 7423, 7523 (nylon) were from Hoechst Celanese, Chatham, N.J. 07928. Other manufacturers of nylon are Allied Signal (Capron®, Capran®), BASF (Ultrarnid®), Du Pont (Zytel(®), and Monsanto (Vydyne®).

Composite materials (reinforced thermoplastic materials) were formed by injection molding into identical nail shapes having a L/d ratio of about 25.5±0.5. Nails were inserted into an industry standard tool (Spotnail) designed for 15 gauge metal finish nails and tested for penetration into three wood types of increasing hardness. The results are presented in Table 1.

TABLE 1

PENETRATION TEST OF NAILS HAVING VARIOUS COMPOSITIONS[1]

|  | (softest) |  | (hardest) |
| --- | --- | --- | --- |
|  | WHIT PINE | YELLOW PINE | OAK |
| Lexan ® 3412 polycarbonate | no | — | — |
| Zytel ® ST-801 nylon | — | no | no |
| Celanese ® 6423 nylon | no | no | no |
| Celanese ® 7423 nylon | no | no | no |
| Celanese ® 7523 nylon | partial | partial | no |
| RX 1 -4090 ABS | no | no | no |
| Vectra ® A130 LCP | yes | yes | no |
| Fortron ® 1140L4 PPS (EX. 2) | yes | yes | partial |
| Amodel ® A 113 3 HS PPA (EX. 1) | yes | yes | yes |
| Amodel ® A I 145HS PPA (EX. 1) | yes | yes | yes |

[1]The nails were made to a L/d ratio of about 25.5 ± 0.5.
no = no penetration; yes = complete penetration; partial = partial penetration; — = not tested Nails formed from polycarbonate, nylon, ABS or liquid crystalline polymer did not perform to the level of nails of the present invention formed from polyphenylene sulfide (PPS) or polyphthalamide (PPA).

The flexural modulus and compression strength of these nails were measured and the data are presented in Table 2.

TABLE 2

STRENGTH TEST OF NAILS HAVING VARIOUS COMPOSITIONS

| SAMPLE | FLEXURAL MODULUS (psi) measured | COMPRESSION STRENGTH (psi) measured |
| --- | --- | --- |
| Lexan ® 3412 | $7.7 \times 10^5$ | $1.47 \times 10^4$ |
| Celanese ® 7523 | $7.17 \times 10^5$ | $1.46 \times 10^4$ |
| Vectrag ® | $2.20 \times 10^6$ | $1.28 \times 10^4$ |
| Fortron ® 1140L4 PPS (EX. 2) | $1.68 \times 10^6$ | $2.03 \times 10^4$ |

TABLE 2-continued

STRENGTH TEST OF NAILS HAVING VARIOUS COMPOSITIONS

| SAMPLE | FLEXURAL MODULUS (psi) measured | COMPRESSION STRENGTH (psi) measured |
|---|---|---|
| Amodel ® A 113 3 HS PPA (EX. 1) | $1.36 \times 10^6$ | $3.22 \times 10^4$ |
| Amodel ® A I 145HS PPA (EX. 1) | $1.92 \times 10^6$ | $3.47 \times 10^4$ |
| Kotowa T-nail | $5.65 \times 10^5$ | $1.5 \times 10^4$ |
| Kotowa Finish | $1.15 \times 10^6$ | $2.07 \times 10^4$ |

Analysis of the maximum stress before failure for ideal columns was performed and is shown for these materials in FIG. 4. The horizontal portion of the curve represents compressive strength and the curved portion of the graph represents Euler bending stress data.

Flexural modulus and compressive strength are independent of L/d ratio. The flexural modulus from these tests is listed in Table 2 and is reflected in the Euler bending stress plotted as the curved part of the graph in FIG. 4. The commercially available Kotowa nails have a flexural modulus of $1.15 \times 10^6$ and $5.65 \times 10^5$, lower than that of nails of the present invention, which have, for example, a flexural modulus of $1.36$–$1.92 \times 10^6$ psi.

Nails made from PPA (AmodelS A I 145HS) show a higher maximum stress to fail than any other nail up to an L/d ratio of about 38. The Amodel(V Al 133HS is superior to prior art nails up an L/d ratio of about 33. The PPS nail of Example 2 (Fortron 11401,4) is superior to prior art nails from an L/d ratio of about 24 to about 36.

Compressive strength is also listed in Table 2 and is represented as the horizontal portion of the graph of FIG. 4. The Kotowa nails have compressive strengths of $1.5$–$2.07 \times 10^4$ psi whereas PPA nails have compressive strengths of $3.22 \times 10^4$–$3.47 \times 10^6$ psi. The PPS nail is superior to the Kotowa nail above an L/d ratio of about 24. The PPS nail (Fortron) does not reach the pure buckling regime until an L/d ratio of about 29 is reached. For comparison, the maximum stress to fail for metal nails is about 230,000 psi for an L/d ratio of about 30 and 125,000 psi for an L/d ratio of about 40.

The performance of nails demonstrating penetration (Table 1) is ranked from highest penetration (1) to lowest (5) as shown in Table 3. The AmodelS, Fortrong, Vectra(& and Celanese(& nails had an L/d ratio of about 25.5, the Kotowa Finish nail, 14.0 and the Kotowa T nail, 11.5.

TABLE 3

CORRELATION OF PENETRATION AND STRENGTH FOR NAILS OF TABLES 1 AND 2

| MATERIAL | PENETRATION RANKING | STRESS TO FAIL |
|---|---|---|
| Arnodel ® Al 145HS | 1 | 32,000 psi |
| Arnodel ® Al 133HS | 2 | 23,400 psi |
| Fortron ® 1140L4 | 3 | 20,300 psi |
| Vectra ® A 130 | 4 | 12,900 psi |
| Celanese ® 7523 | 5 | 11,500 psi |
| Kotowa Finish Nail | — | 19,000 psi |
| Kotowa T-Nail | — | 9,200 psi |

The values correlate with the penetration information. Nail materials of the present invention have a compression strength above about 20,000 psi and a flexural modulus greater than about $1.2 \times 10^6$ psi.

EXAMPLE 4A

AROMATIC POLYAMIDE FASTENERS

Another composite material, Reny® 1032 from Mitsubishi Gas Chemical Co. meets the requirements described in the present patent application for compressive strength and flexural modulus. The flexural modulus of Reny 1032 is $3.03 \times 10^6$ psi, and the compressive strength is $3.28 \times 10^4$ psi. This material is an aromatic polyamide, somewhat similar to polyphthalamide. This material was tested as described below and was found to perform at least as well and probably better than Amodel A 1145 used currently in our commercial nails.

The following table describes the testing done in house on 8 penny common nails made using the Reny 1032 material compared to the nails made using the Amodel Al 145 material: The results reported describe the number of nails fired that performed satisfactorily out of the total number of nails fired. The L/d of these nails is about 21.

| MATERIAL | PRESSURE | TOOL | WOOD | RESULTS | % |
|---|---|---|---|---|---|
| Reny 1032 | 60 psi | Hitachi | treated yellow pine | 232/270 | 86 |
| " | 80 | " | treated yellow pine | 32/40 | 80 |
| " | 90 | " | treated yellow pine | 35/35 | 100 |
| " | 65 | Paslode | treated yellow pine | 79/81 | 98 |
| " | 75 | " | treated yellow pine | 36/40 | 90 |
| " | 85 | " | treated yellow pine | 38/40 | 95 |
| " | 90 | " | treated yellow pine | 36/40 | 90 |
| " | 100 | " | treated yellow pine | 35/40 | 88 |
| Amodel | 60 | Hitachi | treated yellow pine | 73/80 | 91 |

We have not been able to use the Paslode tool successfully with the 8 penny nails made from Arnodel A 1145 (percentage of successful drives less than 50%). The performance of model 8 penny nails decreases at higher nailer pressures, so testing at 60 psi gives the best performance for Amodel nails. Notes from testing describe that Reny nails drove straighter than Amodel nails.

We sent out Reny 8 penny nails and Amodel 8 penny nails to three of our customers to make comparisons of which product they thought performed (penetration) best. The feedback we received was that the Reny nails performed significantly better.

EXAMPLE 5

TENSILE AND SHEAR TESTS

Fasteners of the present invention such as nails and galvanized nails of the same size were partially inserted into white pine for tensile measurements. The 2" nails were inserted through the V wood leaving about ¼" of the nail head end protruding out for gripping by the tensile apparatus. Shear measurements were taken on joints formed with nails of the present invention and galvanized nails of the same size. In both tensile and shear, the galvanized nails failed by the nail being removed from the wood and the composite nails failed by fracture of the nail material. Tensile values for nails of this invention are higher than tensile values for galvanized nails, but shear values for nails of this invention are lower than values for galvanized nails. At least 5 measurements for each test and sample were taken.

TABLE 4

TENSILE AND SHEAR TESTS

| | AVG TENSILE FORCE TO FAILURE | AVG SHEAR FORCE TO FAILURE |
|---|---|---|
| Galvanized steel nails | 48 lbs.* | 91 lbs. |
| Amodel ® A 1133HS | 55 lbs. | 48 lbs. |
| Fortron ® 1140L4 | — | 31 lbs. |

*To obtain the tensile or shear strength, divide the force by the cross sectional area of the nails (0.005 in$^2$).

The tensile force to break Kotowa nails is reported at 9–13 lbs. (Kowa T Nail, manufacturer brochure) and the tensile force to pull out metal nails is reported at 2–3 lbs (McCafferty, P., Popular Science, April, 1987. pp. 66–67). These numbers are not comparable to the above cited force values because: 1) the cross sectional areas are not equal, 2) the surface of the metal is not known (coated, galvanized, uncoated), and 3) the length of penetration is not known for the Kotowa data.

EXAMPLE 6

NAIL PACKS MADE FROM THERMOSET MATERIALS

The present inventors propose forming a nail pack from a thermoset material by several different, but standard methods of forming thermosets. Four of these methods are molding methods, the fifth is a method specific to thermosets called pultrusion. Common thermoset materials include phenolics, urea formaldehydes, melamine formaldehydes, furan resins, polyesters, epoxies, polyurethanes, polyisocyanurates, polyamides, and poly benzimidazoles. Common reinforcement materials include glass fiber, beads, other silica based fillers, asbestos, polymeric fibers, metal fibers, mineral filters, boron fibers, and synthetic organic fibers.

Molding consists of placing a measured charge of material into a heated mold, holding it in the mold until cured and ejecting the part. It is analogous to thermoplastic injection molding with the following differences: i) the resin is liquified at fairly low temperatures compared to a thermoplastic melt at high temperatures; and ii) the mold is kept hot to initiate the cure of the thermoset while with thermoplastics, the mold is kept at a temperature cool enough to solidify the melt. The liquefying temperature, curing temperature and curing time of the resin will be specific to the thermosetting material used.

Method 1: Transfer Molding. The thermosetting molding material (sometimes called bulk molding compound, BMQ is heated and liquified in a chamber pot outside the molding cavity and then transferred into the closed, hot mold cavity with sufficient pressure to fill the cavity and produce a dense, uniform part. Transfer of the material to the mold cavity is accomplished by a plunger that is actuated by the platen press that holds the mold closed or by an auxiliary ram. In the latter case, the clamping force of the platen press must be 20–25% above the total force of the resin in the cavities, sprues and runners under full auxiliary pressure. The material can be preheated and plasticized in a screw chamber and then dropped into the pot to reduce cycle time and automate operations. This is called screw transfer molding.

Method 2: Screw Injection Molding of Thermosets (Direct Screw Transfer). This method is the most similar to thermoplastic injection molding. The thermosetting material in granular or pellet form is fed from the hopper into the barrel and is then moved forward by the rotation of the screw, becoming plasticized or fluid by the conductive and frictional heat. The screw stops turning when the exact amount of material for a charge is accumulated. The screw then moves forward like a plunger by hydraulic pressure analogous to thermoplastic injection molding and forces the charge into the closed mold. The hot mold causes the material to set up or cure before the mold opens and the part is ejected. The screw for thermosets has a compression ratio of zero to prevent premature crosslinking of the resin. The screw compression ratio for thermoplastics is between 1 and 5 to help facilitate melting and plasticizing the material.

Method 3: Reaction Injection Molding. Two low molecular weight, low viscosity liquids that are highly reactive with each other are contained in two storage tanks. One or both may contain a reinforcing filler material. A specific amount of each liquid is metered out and injected by high pressure pumps into a mixing head where the two liquids impinge and mix thoroughly before being transferred to the mold cavity. The thermosetting reaction begins in the mixing head as the two liquids meet, and final cure occurs in the mold before the part is ejected. Mold 10 temperature can be cold, but a higher temperature would speed up the crosslinking reaction. The reinforcement filler may also be placed in the mold before injection. In this case, the mixed liquids would flow around and saturate the filler during injection.

Method 4: Prepreg Molding. Layers of oriented fibers are pre-impregnated with a thermosetting resin and cured to an intermediate stage of polymerization known as B-stage preimpregnated composite precursor or prepreg. These materials may be purchased in this form. The prepreg can be laid up (usually by hand) in the mold for quick conversion into a final product through application of heat which causes the final crosslinking of the material to occur and pressure which causes the material to take the shape of the mold cavity. Precise control of the ply of the prepreg provides optimal strength and stiffness of the reinforced polymer composite.

Method 5: Pultrusion. Continuous strands in the form of roving or other forms of reinforcement are drawn through a liquid resin bath in which the strands are impregnated with the thermosetting resin material. The strand is then pulled through a long heated steel die which shapes the cross-section of the product and controls the resin content. Post processing of the pultruded B-stage "wire" follows similar methods to manufacture of metal nails out of metal wire: a flat bundle of "wires" is cut to a specified length, the points are cut and the nails are headed. The final cure occurs as the stock is passed through an oven. Finally, the flat bundle is cohered by tape, glue or a plastic strip.

EXAMPLE 7

STAPLE PACKS MADE FROM A POLYPHTHALAMIDE COMPOSITE

This example describes a staple of the present invention made from fiber-reinforced polyphthalamide (Amodel 9 A 1145HS and Amodels AS1145HS). The polyphthalamide compounds were dried overnight at 250*F in a convection oven, and each was fed into a reciprocating screw injection molding machine (Arburg 9) at barrel temperature above the melt temperature of the polyphthalamide component (580–630'F). Each composition was plasticated and injected into a hot cavity (275–325'F) for optimum part properties. Cycle times ranged from about 8 to about 30 seconds.

Figure 7:
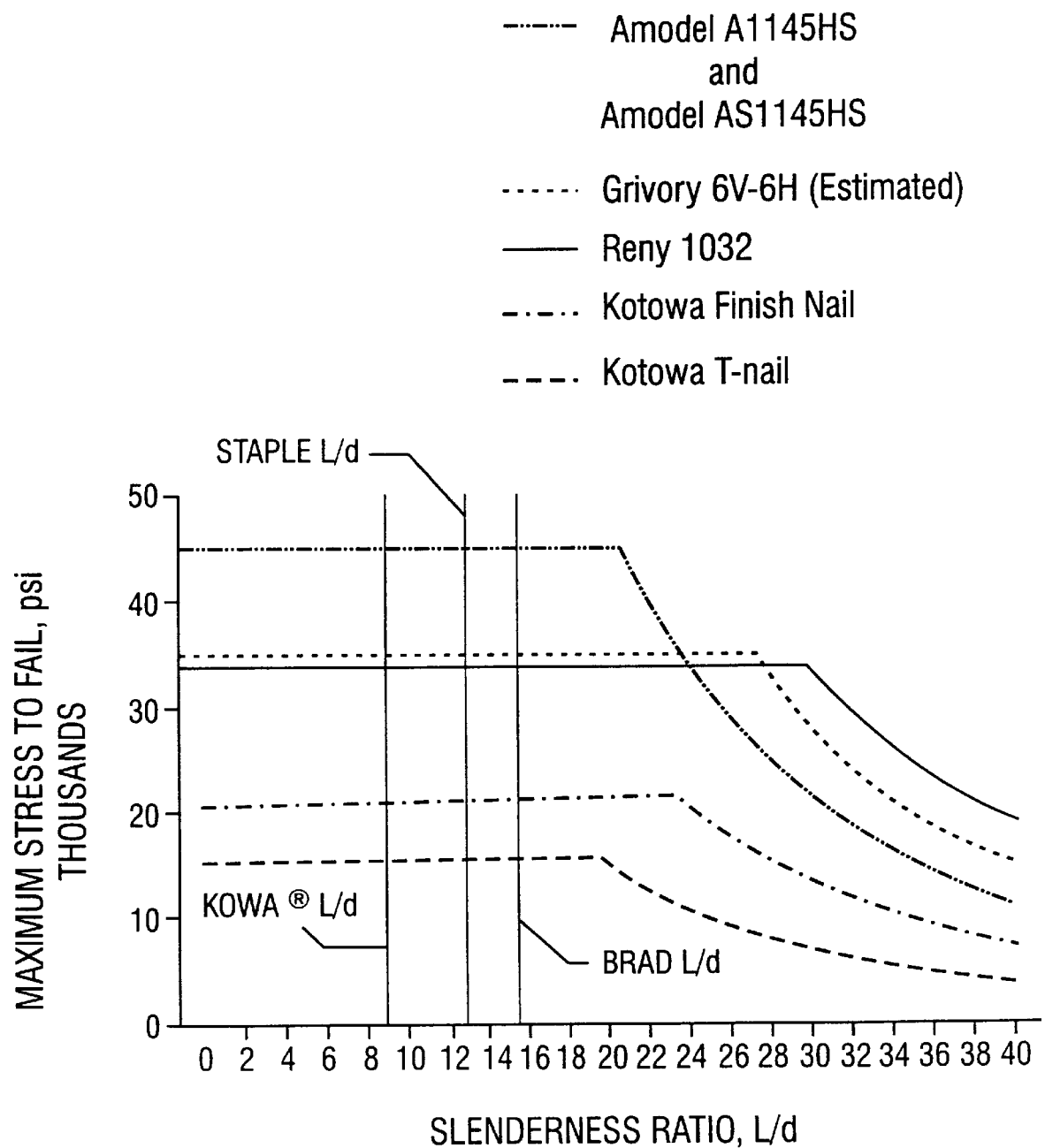
FIG. 7 shows a plot of maximum stress to fail as a function of slenderness ratio for materials used to form the nails and the staples of the present invention.

Mechanical properties of the molded staples was not measured directly, but mechanical properties reported in the product literature can be considered representative for the staples. Compressive strength was approximately 45,000 psi and 45,000 psi, and flexural modulus was approximately 2,000,000 psi and 2,000,000 psi for the A I 145HS and the AS I 145HS, respectively. Staples produced have an L/d ratio of 13. FIG. 7 shows the stress to fail for an impact driven fastener such as a staple using the product literature reported values of compressive strength and flexural modulus.

Staple packs made from the fiber-filled polyphthalamides of this example were inserted into the following pneumatic staplers: BeA 95/16-405, Senco SJS, Fasco FIA SR5-16PLAST, and the following manual staplers: Duo Fast CT859A, Duo Fast HT755, and Stanley-Bostitch ESD 1154. Staples were driven into a variety of commodity softwoods and hardwoods, engineered wood products and the substituted wood product: Trex®; and driven through various sheet products including cardboard, lumberwrap, Tyvek®, aluminum and plastic.

EXAMPLE 8

STAPLE PACKS MADE FROM POLYAMIDE-MXD6 COMPOSITE

This example describes staples made from Reny 1032, a fiber-filled aromatic polyamide, made by Mitsubishi Gas Chemical Co., Inc. (Japan). Reny is a crystalline, thermoplastic molding compound having good injection molding flow properties as well as high mechanical strength, modulus and heat distortion temperature. Reny is made by the polycondensation of metaxylylendiamine and adipic acid. Owing to the low melt viscosity and affinity for glass, Reny can be highly filled with glass fiber reinforcements. Reny 1032 has a 60% reinforcement loading.

The polyamide-MXD6 composition was dried overnight at 200'F in a convection oven and fed into a reciprocating screw injection molding machine (Arburge) at barrel temperatures above the melt of the polymeric component (500–555'F). The composition was plasticated and injected into a hot cavity (about 250–285'F) for optimum part properties. Cycle times were about 20 to about 60 seconds. The present inventors have done the molding of this compound. The staples made from polyamide-MXD6 have an L/d ratio of 13. Product literature values of flexural modulus are 3,030,000 psi and compressive strength are 33,000 psi. The stress to fail for an impact driven fastener made from this particular material composition is shown in FIG. 7.

A staple pack made from polyamide-MXD6 molding compound of this example was inserted into two pneumatic staplers: BeA 95/16-405 and Fasco FIA SR5-16PLAST, and staples were driven into a variety of softwoods and hardwoods. Fasteners made from polyamide-MXD6 have a greater flexural modulus than prior art composite fasteners, but Amodel 9 PPA staples are most preferred in this particular L/d region because of the higher stress to fail of the impact driven fasteners formed from Amodel. At L/d ratios above 24, polyamide-MXD6 would likely be the preferred composition for impact driven fasteners since the stress to fail in this range is higher than for Amodel® PPA.

EXAMPLE 9

STAPLE PACKS MADE FROM AROMATIC POLYAMIDE COMPOSITE

This example describes staples made from an aromatic polyamide, in particular, Grivory GV-6H, made by EMS (Sumter, SQ. This aromatic polyamide is an amorphous thermoplastic and is reinforced with 60% glass fibers. Grivory composites have very low warpage and high stiffness. They exhibit good injection moldability and good surface finish, an unusual characteristic for materials with high glass loadings. Grivory composites also exhibit less tool abrasion than other filled thermoplastics and it has good chemical resistance. The method of manufacturing the polymeric base is not available in EMS product literature.

Grivory GV-6H was dried overnight at 2257 in a convection oven, and fed into a reciprocating screw injection molding machine (Arburg®) at barrel temperatures above the melt of the polymeric component (545–5727). The composition was plasticated and injected into a hot cavity. Mold temperatures used were between 176 and 212'F. Cycle times ranged from about 8 to about 40 seconds.

Mechanical properties of the molded staples made from this aromatic polyamide composition were not measured directly, but mechanical properties reported in the product literature can be considered representative for the staples. Flexural modulus is approximately 2,500,000 psi, while compressive strength information for this composition is not available. Compressive strength is estimated to be in the vicinity of 35,000 psi for this composition.

Staples produced had an L/d ratio of 13. FIG. 7 shows the stress to fail at high L/d ratios for an impact driven fastener such as a staple using the product literature reported values of compressive strength and flexural modulus. The dashed line for low L/d ratios is estimated from the reliability of penetration into hard woods by staples made from this aromatic polyamide.

A staple pack made from the aromatic polyamide composition of this example was inserted into the following standard stapler: Fasco FIA SR5-16PLAST. Staples were driven into a variety of softwoods and hardwoods. Fasteners made from Grivory GV-6H have a higher flexural modulus than prior art composite fasteners, but Amodel® PPA staples are most preferred in this particular L/d region because of the higher stress to fail of the impact driven fasteners formed from Amodel. At higher L/d ratios, Grivory GV-6H may be preferred over Amodel owing to the greater flexural modulus which provides higher stress to fail.

EXAMPLE 10

PENETRATION AND STRESS TO FAIL TESTS

The analysis presented in this example demonstrates that prior art staples are inferior to staples of the present invention primarily due to the lower strength of the materials used in prior art staples which limits both the hardness of materials (such as wood) that prior art staples can penetrate, and the slenderness ratio that can be achieved with prior art staples.

Staples of Examples 7, 8, and 9 were inserted into an industry standard stapler (Fasco F 1 A SR5-16PLAST) and tested for penetration into oak and into Trex® a at standard air pressure of 90 psi. Also, an existing polymer staple made by Kowa® a with an L/d ratio of 9.3 was inserted into the Kowa& stapler which accommodates plastic staples made by Kowa® and no other staples. The Kowa® ID staple was tested for penetration into the same piece of oak and Trex® at standard air pressure of 90 psi. The results are presented in Table 5.

TABLE 5

Percent Reliable Penetration* of Staples

| | TREX ® | OAK |
|---|---|---|
| Amodel A I 145HS | 98 | 86 |
| Amodel AS I 145HS | 96 | 86 |
| Reny 1032 | 96 | 80 |
| Grivo2i GV-6H | 88 | 66 |
| Kowa | 26 | 0 |

*reliable penetration means that the staple did not break upon driving

Kowa staples did not perform to the level of staples of the present invention formed from Amodel, Reny or Grivory. Staples of the same material but at different L/d rations should provide better presentation at lower L/d ratios because the stress to fail for impact driven fasteners of any particular material is highest for very small L/d ratios. Therefore, if a staple were made from the material used in the existing Kowa staple, having the shape of the staples of the present invention (L/d ratio of 13), one would expect such a staple to provide even poorer performance than existing Kowa staple.

Mechanical properties of Kowa® staples were not measured directly, but the values of compressive strength and flexural modulus measured on other Kowa® impact driven fasteners might be reasonable values for this Kowa® product. These values are used to calculate the maximum stress to fail shown in FIG. 7. Comparison of the maximum stress to fail at the appropriate L/d correlates to the penetration performance tested and reported in Table 5. The highest stress to fail is provided with Amodel®, while the lowest stress to fail is provided by materials used for Kowa® fasteners. This correlation provides support for inclusion of staples as a type of nail or a separate category of impact driven fasteners in the present invention.

EXAMPLE 11

OTHER IMPACT DRIVE FASTENERS MADE FROM COMPOSITES HAVING HIGH COMPRESSIVE STRENGTH AND FLEXURAL MODULUS

Figure 8:
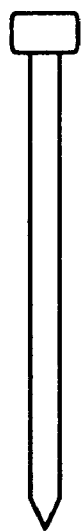
FIG. 8 shows a side view of a brad.
Figure 9:
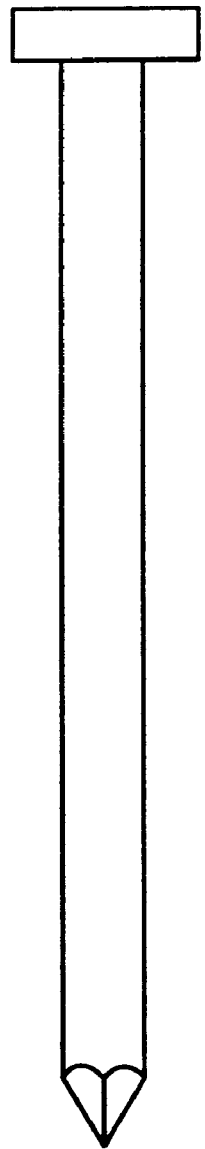
FIG. 9 shows a side view of a spike
Figure 10A:
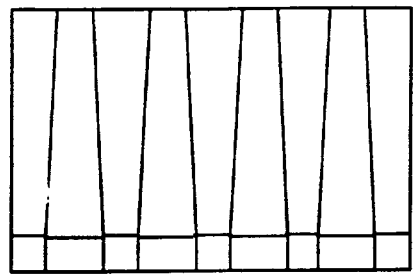
FIGS. 10A, 10B and 10C show side views of various corrugated fasteners.
Figure 10B:
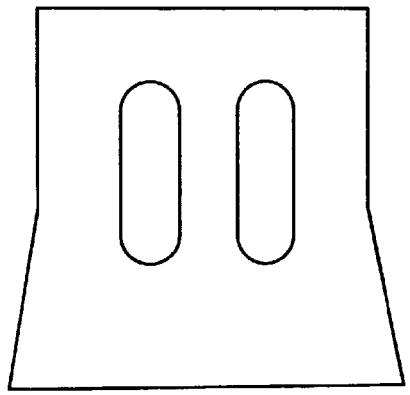
Figure 10C:
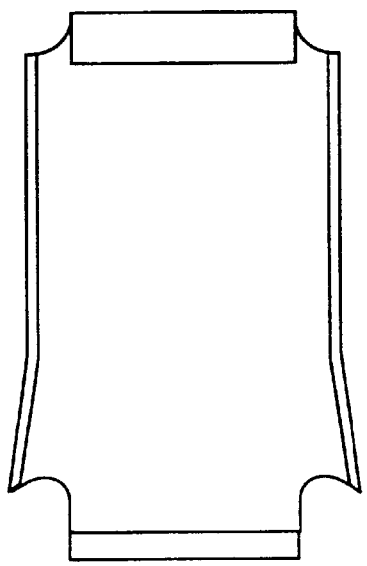

Other types of impact driven objects, intended to penetrate a substrate by force applied other object during penetration, are expected to work according to the present invention. Stakes, swords, corrugated fasteners (see FIGS. 10A–10C), see spikes (see FIG. 9), brads (see FIG. 8), pins, rivets and the like are examples of such impact driven objects. Working impact driven objects must be made from materials having high flexural modulus and high compressive strength.

EXAMPLE 12

BRADS MADE FROM AROMATIC POLYAMIDE COMPOSITE

This example describes brads made from an aromatic polyamide, in particular, Grivory GV-611, made by EMS (Sumter, SQ. This aromatic polyamide is described above.

Grivory GV-6H was dried overnight at 2250 F in a convection oven, and fed into a reciprocating screw injection molding machine (Arburg 8) at barrel temperatures above the melt of the polymeric component (545–572'F). The composition was plasticated and injected into a hot cavity. Mold temperatures used were between 176 and 212*F. Cycle times ranged from about 8 to about 30 seconds.

Mechanical properties of the molded brads made from this aromatic polyamide composition were not measured directly, but mechanical properties reported in the product literature can be considered representative for the brads. Brads produced had an L/d ratio of 15. The stress to fail for impact driven fasteners at this L/d ratio can be estimated from FIG. 7.

A brad pack made from the aromatic polyamide composition of this example was inserted into the following standard brad nailer: Omer 30.12. Brads were driven into a variety of softwoods and hardwoods. Penetration reliability was slightly lower than penetration reliability of Amodel brads having the same L/d ratio. At this particular L/d, the Amodel is preferred. At higher L/d ratios, Grivory GV-6H may be preferred over Amodel owing to the greater flexural modulus which provides higher stress to fail.

EXAMPLE 13

BRAD PACKS MADE FROM POLYAMIDE-MXD6 COMPOSITE

This example describes brads made from Reny 1032, a fiber-filled aromatic polyamide, made by Mitsubishi Gas Chemical Co., Inc. (Japan). Reny is described above.

The polyamide-MXD6 composition was dried overnight at 200'F in a convection oven and fed into a reciprocating screw injection molding machine (Arburg ID ) at barrel temperatures above the melt of the polymeric component (500–555'F). The composition was plasticated and injected into a hot cavity (about 250–285'F) for optimum part properties. Cycle times were about 20 to about 45 seconds. The present inventors have done the molding of this compound. The brads made from polyamide-MXD6 have an L/d ratio of 15. Product literature values of flexural modulus are 3,030,000 psi and compressive strength are 33,000 psi. The stress to fail for an impact driven fastener made from this particular material composition is shown in FIG. 7.

A brad pack made from polyamide-MXD6 molding compound of this example w as inserted into an Omer 30.12 industry standard pneumatic bradders, and brads were driven into a variety of softwoods and hardwoods. Penetration reliability was slightly lower than for Arnodel brads having the same L/d ratio. Fasteners made from polyamide-MXD6 have a greater flexural modulus than prior art composite fasteners, but Amodel a PPA brads are most preferred in this particular L/d region because of the higher stress to fail of the impact driven fasteners formed from Amodel.

The references cited above are incorporated in pertinent part by reference herein for the reasons cited above.

It is understood that the examples and embodiments described herein are for illustrative purposes only and that various modifications in light thereof will be suggested to persons skilled in the art and are to be included within the spirit and purview of this application and scope of the appended claims.

What is claimed is:

1. A plastic staple, the staple comprising a plastic composite, the plastic composite comprising a compression strength greater than about 20,000 psi and a flexural modulus greater than about $1.2 \times 10^6$ psi, wherein the staple has an slenderness ratio of up to about 38.

2. The staple of claim 1 wherein the staple is configured for use in an impact driving staple machine.

3. The staple of claim 1 wherein the plastic composite comprises a thermoset material.

4. The staple of claim 1 wherein the plastic composite comprises a thermoplastic material.

5. The staple of claim 1 wherein the plastic composite comprises a thermoplastic material, the thermoplastic material comprising polyphenylene sulfide.

6. The staple of claim 1 wherein the plastic composite comprises a thermoplastic material, the thermoplastic material comprising polyetherimide.

7. The staple of claim 1 wherein the plastic composite comprises a thermoplastic material, the thermoplastic material comprising polyamide-imide.

8. The staple of claim 1 wherein the plastic composite comprises a thermoplastic material, the thermoplastic material comprising fiber-filled polyphthalamide, the fiber filled polyphthalamide comprising about 10 to about 200 parts by weight reinforcing fibers per hundred parts by weight of polyphthalamide component.

9. The staple of claim 1 wherein the staple is driveable through a material comprising a hardness of up to about 1150 pounds without deformation or breakage.

10. The staple of claim 1 wherein the staple is driveable through a material comprising a hardness of up to about 1150 pounds without deformation or breakage, and wherein the plastic composite comprises a thermoplastic material.

11. The staple of claim 1 wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple.

12. The staple of claim 1 wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material.

13. The staple of claim 1 wherein the compression strength of the staple is substantially greater than a compression strength of a metal staple comprising an slenderness ratio about equal to the slenderness ratio of the staple, and wherein the flexural modulus of the staple is substantially greater than a flexural modulus of the metal staple.

14. The staple of claim 1 wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material, and wherein the compression strength of the staple is substantially greater than a compression strength of a metal staple comprising an slenderness ratio about equal to the slenderness ratio of the staple, and wherein the flexural modulus of the staple is substantially greater than a flexural modulus of the metal staple.

15. The staple of claim 1 wherein the staple is configured for use in an impact driving machine.

16. The staple of claim 1 wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material, and wherein the compression strength of the staple is substantially greater than a compression strength of a metal staple comprising an slenderness ratio about equal to the slenderness ratio of the staple, and wherein the flexural modulus of the staple is substantially greater than a flexural modulus of the metal staple, and wherein the staple is configured for use in an impact driving machine.

17. The plastic staple as defined in claim 1, further comprising a second plastic staple, wherein at least the first and second staples are coupled together to form a staple pack.

18. The plastic staple as defined in claim 17, wherein the staple pack is configured for use in an impact driving machine.

19. A plastic staple, the staple comprising a plastic composite having a compression strength greater than about 20,000 psi, a flexural modulus greater than about 1.2 million psi, and a slenderness ratio that is greater than about 18 and less than about 38.

20. The plastic staple as defined in claim 19, wherein the slenderness ratio is greater than about 25.

21. The plastic staple as defined in claim 19, wherein the slenderness ratio is greater than about 30.

22. The plastic staple as defined in claim 19, further comprising a second plastic staple, wherein at least the first and second staples are coupled together to form a staple pack.

23. The plastic staple as defined in claim 22, wherein the staple pack is configured for use in an impact driving machine.

24. The staple of claim 22, wherein the staple pack is configured for use in an impact driving staple machine.

25. The staple of claim 19, wherein the plastic composite comprises a thermoset material.

26. The staple of claim 19, wherein the plastic composite comprises a thermoplastic material.

27. The staple of claim 19, wherein the plastic composite comprises a thermoplastic material, the thermoplastic material comprising polyphenylene sulfide.

28. The staple of claim 19, wherein the plastic composite comprises a thermoplastic material, the thermoplastic material comprising polyetherimide.

29. The staple of claim 19, wherein the plastic composite comprises a thermoplastic material, the thermoplastic material comprising polyamide-imide.

30. The staple of claim 19, wherein the plastic composite comprises a thermoplastic material, the thermoplastic material comprising fiber-filled polyphthalamide, the fiber filled polyphthalamide comprising about 10 to about 200 parts by weight reinforcing fibers per hundred parts by weight of polyphthalamide component.

31. The staple of claim 19, wherein the staple is driveable through a material comprising a hardness of up to about 1150 pounds without deformation or breakage.

32. The staple of claim 19, wherein the staple is driveable through a material comprising a hardness of up to about 1150 pounds without deformation or breakage, and wherein the plastic composite comprises a thermoplastic material.

33. The staple of claim 19, wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple.

34. The staple of claim 19, wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material.

35. The staple of claim 19, wherein the compression strength of the staple is substantially greater than a compression strength of a metal staple comprising a slenderness ratio about equal to the slenderness ratio of the staple, and wherein the flexural modulus of the staple is substantially greater than a flexural modulus of the metal staple.

36. The staple of claim 19, wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material, and wherein the compression strength of the staple is substantially greater than a compression strength of a metal staple comprising a slenderness ratio about equal to the slenderness ratio of the staple, and wherein the flexural modulus of the staple is substantially greater than a flexural modulus of the metal staple.

37. The staple of claim 19, wherein the staple is configured for use in an impact driving machine.

38. The staple of claim 19, wherein the staple is driveable through a material comprising a hardness of up to about 1150 pounds without deformation or breakage, and wherein the staple is substantially fixed within the material, and wherein attempted removal of the staple results in substantial breakage of the staple prior to removal of the staple, and wherein the plastic composite comprises a thermoplastic material, and wherein the compression strength of the staple is substantially greater than a compression strength of a metal staple comprising a slenderness ratio about equal to the slenderness ratio of the staple, and wherein the flexural modulus of the staple is substantially greater than a flexural modulus of the metal staple, and wherein the staple is configured for use in an impact driving machine.

39. A plastic staple, the staple comprising a plastic composite having a compression strength greater than about 20,000 psi, a flexural modulus greater than about 1.2 million psi, and a slenderness ratio that is greater than about 25 and less than about 38.

40. A plastic staple, the staple comprising a plastic composite having a compression strength greater than about 20,000 psi, a flexural modulus greater than about 1.2 million psi, and a slenderness ratio that is greater than about 30 and less than about 38.

* * * * *